(12) United States Patent
Belmon et al.

(10) Patent No.: US 11,598,268 B2
(45) Date of Patent: Mar. 7, 2023

(54) DOUBLE-FLOW TURBOJET ENGINE ASSEMBLY WITH EPICYCLOIDAL OR PLANETARY GEARBOX

(71) Applicant: SAFRAN AIRCRAFT ENGINES, Paris (FR)

(72) Inventors: Guillaume Claude Robert Belmon, Moissy-Cramayel (FR); Cédric Zaccardi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/294,593

(22) PCT Filed: Nov. 21, 2019

(86) PCT No.: PCT/FR2019/052775
§ 371 (c)(1),
(2) Date: May 17, 2021

(87) PCT Pub. No.: WO2020/109703
PCT Pub. Date: Jun. 4, 2020

(65) Prior Publication Data
US 2022/0010735 A1 Jan. 13, 2022

(30) Foreign Application Priority Data
Nov. 27, 2018 (FR) ........................................ 1871930

(51) Int. Cl.
*F02C 7/36* (2006.01)
*F02C 3/107* (2006.01)
(Continued)

(52) U.S. Cl.
CPC ................ *F02C 7/36* (2013.01); *F02C 3/107* (2013.01); *F02C 7/06* (2013.01); *F02K 1/04* (2013.01);
(Continued)

(58) Field of Classification Search
CPC .... F02C 7/36; F02C 7/06; F02C 3/107; F02K 1/04; F02K 3/06; F05D 2220/323;
(Continued)

(56) References Cited

U.S. PATENT DOCUMENTS 3,673,802 A * 7/1972 Krebs ..................... F02C 3/067
60/268
8,667,777 B2 * 3/2014 Gallet ..................... F02K 3/072
60/268
(Continued)

FOREIGN PATENT DOCUMENTS

EP          2 071 153 A2     6/2009
WO    WO-2015006162 A1 *   1/2015  ................ F02C 3/10

OTHER PUBLICATIONS

International Search Report dated Mar. 12, 2020 in PCT/FR2019/052775 filed on Nov. 21, 2019, 2 pages.
French Preliminary Search Report dated Jul. 11, 2019 in French Patent Application No. 18 71930 filed on Nov. 27, 2018 (with translation of category of cited documents), 2 pages.

*Primary Examiner* — Woody A Lee, Jr.
*Assistant Examiner* — Joshua R Beebe
(74) *Attorney, Agent, or Firm* — Oblon, McClelland, Maier & Neustadt, L.L.P.

(57) ABSTRACT

A turbojet engine including a shaft surrounded by a low-pressure rotor surrounded by a coaxial and independent high-pressure spool, this turbojet engine including from upstream to downstream: a fan driven by the shaft; a low-pressure compressor carried by the rotor; an inter-compressor casing; a high-pressure compressor and a high-pressure turbine carried by the high-pressure spool; an inter-turbine casing; a low-pressure turbine carried by the rotor; an exhaust casing; this turbojet engine including an upstream rotor bearing carried by the inter-compressor casing; a downstream rotor bearing carried by the exhaust casing; a gearbox downstream of the downstream bearing (Continued)

and through which the rotor drives the shaft; a downstream shaft bearing downstream of the downstream rotor bearing.

7 Claims, 3 Drawing Sheets

(51) Int. Cl.
*F02C 7/06* (2006.01)
*F02K 1/04* (2006.01)

(52) U.S. Cl.
CPC .... *F05D 2220/323* (2013.01); *F05D 2220/36* (2013.01); *F05D 2260/40311* (2013.01)

(58) Field of Classification Search
CPC ....... F05D 2220/36; F05D 2260/40311; F05D 2240/50; F01D 25/16
See application file for complete search history.

(56) References Cited

U.S. PATENT DOCUMENTS

| | | | | |
|---|---|---|---|---|
| 2009/0151317 | A1* | 6/2009 | Norris | F02C 3/107 |
| | | | | 415/68 |
| 2013/0223992 | A1* | 8/2013 | Suciu | F02C 3/067 |
| | | | | 415/122.1 |
| 2015/0176484 | A1* | 6/2015 | Schwarz | F02C 3/107 |
| | | | | 415/1 |
| 2015/0176497 | A1* | 6/2015 | Schwarz | F02K 3/06 |
| | | | | 415/122.1 |
| 2016/0025003 | A1* | 1/2016 | Schwarz | F04D 29/321 |
| | | | | 415/69 |
| 2018/0223732 | A1* | 8/2018 | Clements | F02C 3/067 |
| 2019/0085722 | A1* | 3/2019 | Pankaj | F02C 3/067 |
| 2019/0085725 | A1* | 3/2019 | Zatorski | F02C 3/067 |

* cited by examiner

DOUBLE-FLOW TURBOJET ENGINE ASSEMBLY WITH EPICYCLOIDAL OR PLANETARY GEARBOX

TECHNICAL FIELD

The invention relates to a twin-spool turbojet engine assembly integrating an epicycloidal or planetary gearbox.

PRIOR ART

In such an engine 1 represented in FIG. 1, air is drawn into an inlet duct 2 to pass through a fan 3 including a series of rotating blades before being split into a central primary flow and a secondary flow surrounding the primary flow.

Afterwards, the primary flow is compressed in compression stages 4 and 6 before reaching a combustion chamber 7, after which it expands through a high-pressure turbine 8 and a low-pressure turbine 9 before being discharged rearwards. In turn, the secondary flow is propelled directly rearwards by the fan within a flow path delimited by the casing 11.

Such a twin-spool type engine includes a so-called low-pressure spool by which the fan 3 is coupled to the low-pressure turbine, and a so-called high-pressure spool by which the compressor is coupled to the high-pressure turbine, these two spools being coaxial and rotatably independent of each other.

Thanks to a gearbox interposed between the low-pressure turbine and the fan, the low-pressure turbine rotates faster than the fan driven thereby, in order to increase efficiency. In this configuration, the low-pressure spool includes a central shaft for driving the fan and a rotor carrying the low-pressure turbine while being connected to the central shaft through the gearbox.

The high-pressure and low-pressure spools are held by bearings carried by structural elements of the engine. In practice, the low-pressure spool is a critical element of the assembly, because its central shaft extends substantially over the entire length of the engine, so that during operation, that is to say when it rotates, it may be subject to vibration modes that could lead to the destruction of the engine. In particular, because of its considerable length, the first flexural vibration mode of the central shaft lies within its operating range, that is to say within the range of frequencies corresponding to its rotational frequencies.

This situation requires carrying out a high-speed balancing of the central shaft, but also providing for bearings that are capable of damping its vibration modes to limit possible imbalances. Such bearings, generally referred to by the acronym SFD meaning "squeeze film dampers" include a fixed soft cage carrying a bearing receiving the central shaft, and around which a hydraulic pressure is maintained, this bearing type being expensive to implement.

The invention aims to provide assembly solutions allowing improving the holding of the low-pressure rotating elements to limit resort to complex bearings for damping vibration modes.

DISCLOSURE OF THE INVENTION

To this end, an object of the invention is a double-flow turbojet engine including a central shaft coaxially surrounded, on the one hand, by a low-pressure rotor and, on the other hand, by a high-pressure spool, coaxial with each other, the high-pressure spool being rotatably independent of the low-pressure rotor and of the central shaft, this turbojet engine including from upstream to downstream according to the direction of circulation of the flow that passes therethrough when it is operating:
- a fan driven by the central shaft;
- a low-pressure compressor carried by the low-pressure rotor;
- an inter-compressor casing;
- a high-pressure compressor and a high-pressure turbine belonging to the high-pressure spool;
- an inter-turbine casing;
- a low-pressure turbine carried by the low-pressure rotor;
- an exhaust casing;

this turbojet engine further including:
- an upstream rotor bearing carried by the inter-compressor casing and which rotatably guides the low-pressure rotor;
- a downstream rotor bearing carried by the exhaust casing, and which rotatably guides the low-pressure rotor;
- a gearbox through which the low-pressure rotor drives the central shaft, this gearbox being located downstream of the downstream rotor bearing;
- a downstream shaft bearing which rotatably guides the central shaft while being located downstream of the downstream rotor bearing.

With this assembly, the speed of the central shaft is reduced and its length is increased thanks to the shaft bearing located downstream, which helps reducing the frequencies of its normal modes to bring them away from the rotational frequencies. The reduction of this speed of the central shaft also allows increasing the fan diameter without the tip speed of the blades of this fan becoming excessive.

The invention also relates to a turbojet engine as defined, wherein the gearbox is located downstream of at least one radial arm for the passage of a utility belonging to the exhaust casing and linking an inner shroud of the exhaust casing to an outer shroud of this exhaust casing.

The invention also relates to a turbojet engine as defined, wherein the downstream central shaft bearing is an inter-shaft bearing which surrounds the central shaft and which is surrounded by the low-pressure rotor.

The invention also relates to a turbojet engine as defined, wherein the downstream central shaft bearing is carried by the exhaust casing while being located downstream of the gearbox.

The invention also relates to a turbojet engine as defined, comprising a low-pressure middle bearing carried by the inter-turbine casing and receiving the low-pressure rotor.

The invention also relates to a turbojet engine as defined, comprising an outlet cone carried by the exhaust casing, and wherein the downstream shaft bearing is located in an inner space of the outlet cone.

The invention also relates to a turbojet engine as defined, wherein the gearbox is located inside the inner space.

The invention also relates to a turbojet engine as defined, wherein the gearbox is an epicycloidal gearbox comprising:
- planets carried by a planet carrier which is carried by the central shaft;
- an inner crown which is carried by the low-pressure rotor;
- an outer crown which is carried by the exhaust casing;
- each planet meshing with the inner crown and the outer crown.

The invention also relates to a turbojet engine as defined, wherein the gearbox is a planetary gearbox comprising:
- planets carried by a planet carrier which is carried by the exhaust casing;
- an inner crown which is carried by the low-pressure rotor;
- an outer crown which is carried by the central shaft;

each planet meshing with the inner crown and the outer crown.

DETAILED DISCLOSURE OF PARTICULAR EMBODIMENTS

Figure 2:
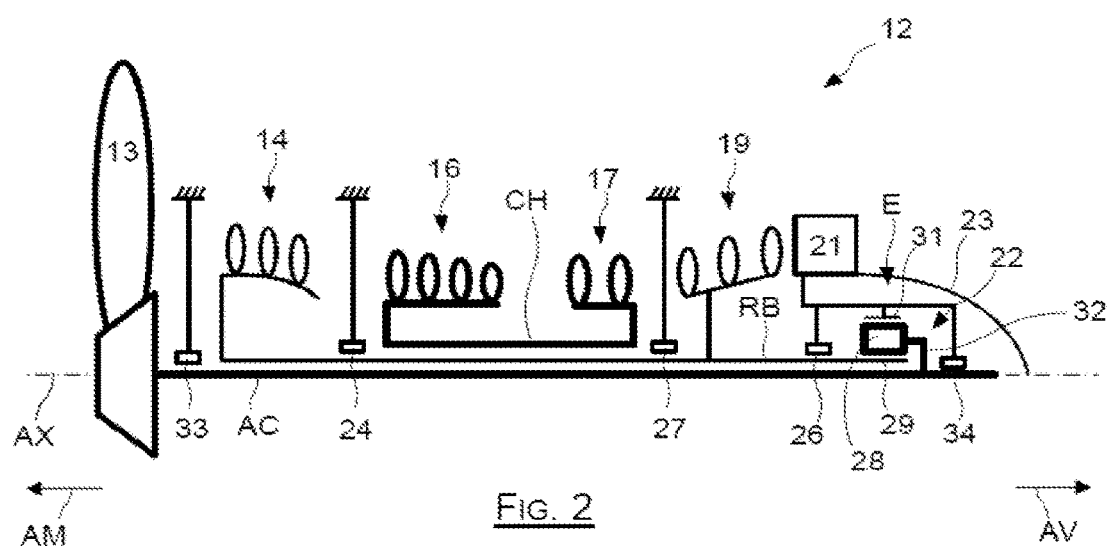
FIG. 2 is a schematic longitudinal sectional view of a turbojet engine architecture according to the invention.

As schematically represented in FIG. 2, the engine according to the invention features an architecture comprising a fan 13 at its upstream portion AM which is driven in rotation by a central shaft AC extending over most of the length of the engine, from upstream AM to downstream AV defined with respect to the direction of circulation of the flow in this engine, in accordance with usual conventions.

This fan 13 is followed by a low-pressure compressor 14 which belongs to a low-pressure rotor RB surrounding the central shaft AC, this low-pressure compressor 14 being followed by a high-pressure compressor 16, to compress the flow before it is drawn into a non-represented combustion chamber located immediately downstream of this high-pressure compressor 16.

After passage in the combustion chamber, the fluid expands through a high-pressure turbine 17 which drives the compressor 16. The blades of the high-pressure compressor 16 and of the high-pressure turbine 17 are carried by the same high-pressure spool CH or are integrally made with the latter. This high-pressure spool CH extends in the central region of the engine along the axis AX, it surrounds the low-pressure rotor RB while being fully rotatably independent thereof.

After having passed through the high-pressure turbine 17, the fluid transits in a non-represented inter-turbine casing, before passing through a low-pressure turbine 19, and is then discharged through an exhaust casing 21.

The inter-turbine casing includes concentric outer shroud and inner shroud delimiting therebetween an annular space for the passage of the primary flow, as well as a set of fixed radial blades each linking the outer shroud to the inner shroud and allowing de-twisting the primary flow. Similarly, the exhaust casing 21 includes concentric outer shroud and inner shroud delimiting an annular space for the passage of the expanded primary flow, as well as a set of fixed radial arms each linking these two shrouds to each other.

The low-pressure turbine 19 and the low-pressure compressor 14 are carried by the low-pressure rotor RB so as to form one set with the latter, and this low-pressure rotor is rotatably linked to the central shaft AC by an epicycloidal gearbox 22 located downstream AV. Thus, the low-pressure rotor RB rotates faster than the fan 13, which allows improving the efficiency of the engine.

The exhaust casing 21 carries an outlet cone 23 which closes the downstream region of the engine located radially inward of the primary flow path, this outlet cone 23 extending downstream. The gearbox 22 is located inside an inner space E delimited by the exhaust casing 21 and by the outlet cone 23 extending this casing 21.

The low-pressure rotor RB is held and rotatably guided by an upstream bearing 24 located upstream of the high-pressure compressor 16 while being carried by a non-represented inter-compressor casing extending between the compressors 14 and 16, and by a downstream bearing 26 located between this low-pressure turbine 19 and the gearbox 22 while being carried by the exhaust casing 21.

Advantageously, an additional middle bearing 27 is provided between the high-pressure turbine 17 and the low-pressure turbine 19, while being carried by a non-represented inter-turbine casing located between the turbines 17 and 19, to hold the low-pressure rotor RB in this region. Thus, the upstream bearing 24 is located upstream of the high-pressure spool CH, whereas the middle 27 and downstream 26 bearings are located downstream of the high-pressure spool CH.

At least one of the two bearings 24 and 26 is a thrust bearing, that is to say taking up the axial thrust force generated by the low-pressure turbine 19 to transfer it to the structure of the engine.

Figure 3:
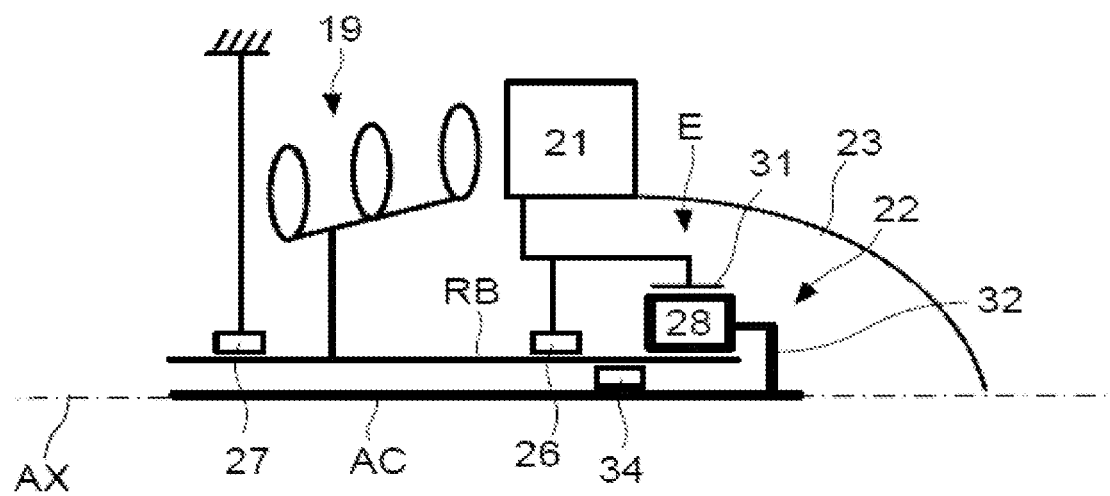
FIG. 3 is a schematic longitudinal sectional representation of a rear portion of a turbojet engine according to the invention.

The gearbox 22 of the example of FIGS. 2 and 3 is an epicycloidal gearbox. It includes planet pinions 28 surrounding an inner crown 29 and surrounded by an outer crown 31 each meshing with these two crowns, these pinions 28 being carried by a planet carrier 32.

The planet carrier 32 is rotatably movable while being rigidly secured to the central shaft AC. In turn, the inner crown 29 is rigidly secured to the low-pressure rotor RB whereas the outer crown 31 is rigidly secured to the exhaust casing 21 while being carried by the latter.

Figure 4:
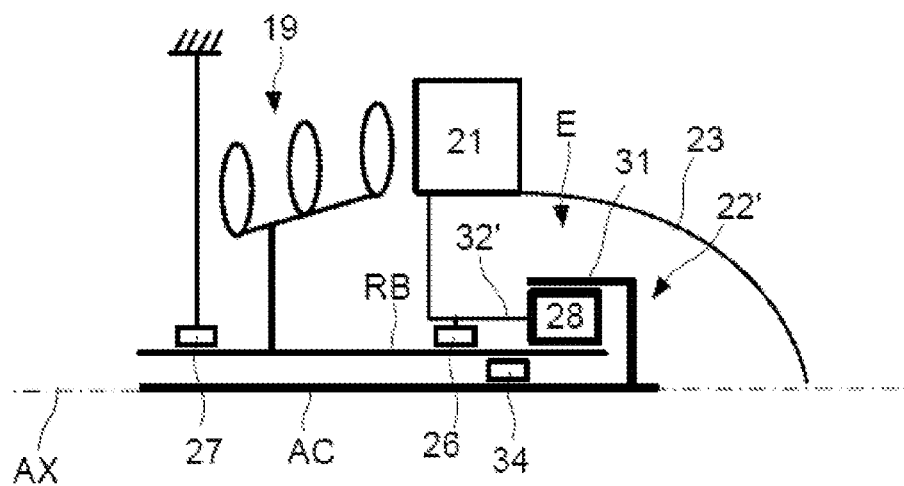
FIG. 4 is a schematic longitudinal sectional representation of a rear portion of a turbojet engine in accordance with a variant of the invention.

It is also possible to provide for a planetary-type gearbox. In the case that is represented in FIG. 4, the gearbox 22' includes a planet carrier 32' that is rotatably fixed while being carried by the exhaust casing, and the outer crown 31 is rigidly secured to the central shaft AC. In turn, the inner crown 29 is rigidly secured to the low-pressure rotor RB as in the case of an epicycloidal gearbox.

The central shaft AC is carried and rotatably guided by an upstream shaft bearing 33 located at the upstream portion of the engine, and by a downstream shaft bearing 34 which is located downstream of the gearbox 22, while being carried by the exhaust casing 21. As shown in FIG. 2, the upstream bearing 33 is located between the fan 13 and the low-pressure compressor 14, the downstream shaft bearing 34 is located in an inner space E of the outlet cone 23, downstream of the gearbox 22.

Figure 1:
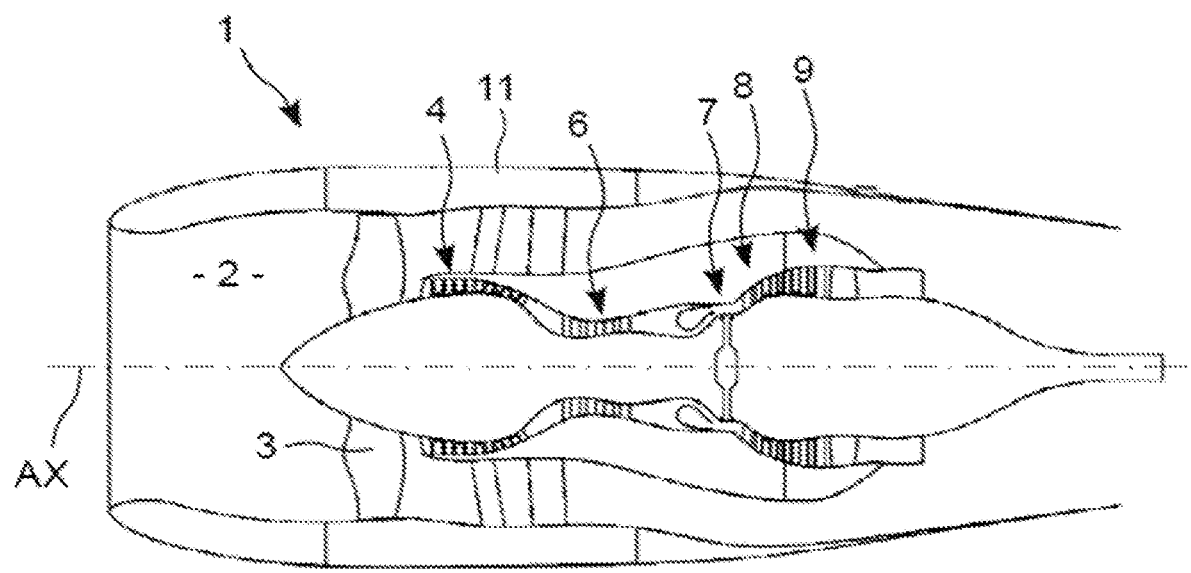
FIG. 1 is a longitudinal sectional view of a known double-flow twin-spool turbojet engine.

In the example of FIG. 1, the downstream central shaft bearing 34 is a fixed bearing carried by the exhaust casing 21 while being located downstream of the gearbox 22. Complementarily, or alternatively as represented in FIG. 3, the downstream central shaft bearing 34 may be an inter-shaft bearing, which surrounds the shaft AC to hold it and rotatably guide it, while being surrounded by the rotor RB, and while being located downstream of the downstream rotor bearing 26. In this configuration, the downstream portion of the central shaft AC is thus held via the low-pressure rotor RB, and not directly by the exhaust casing 21.

Figure 5:
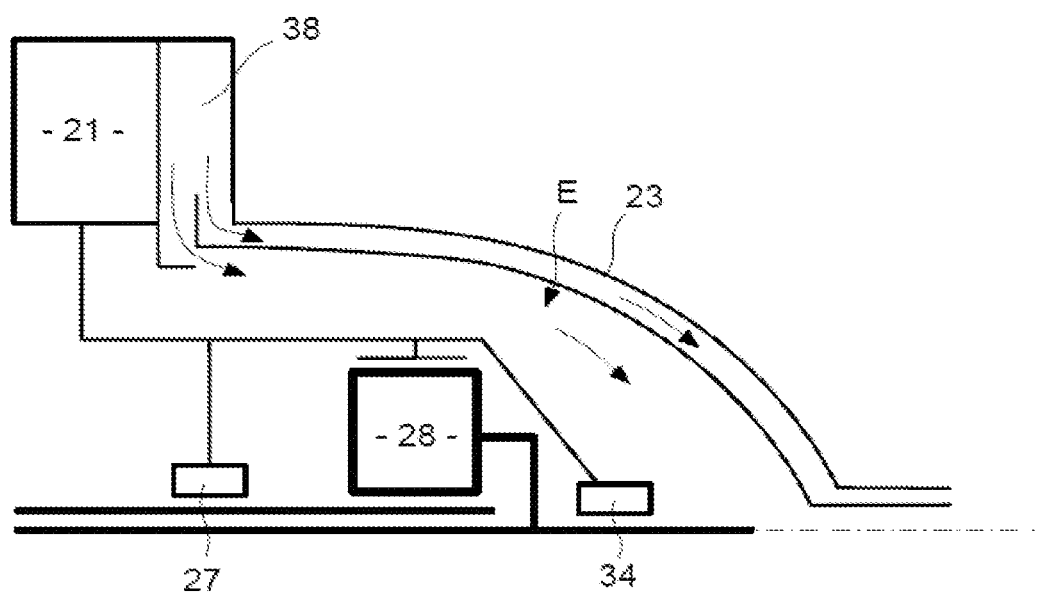
FIG. 5 is a schematic representation of cooling of the outlet cone in the architecture according to the invention.

As schematically represented in FIG. 5, cooling of the inner space E of the outlet cone is advantageously ensured thanks to one or several radial arm(s) 38 of the exhaust casing 21, through which cooling air originating from the secondary flow path is conveyed. The cooling air is then split upon arrival in the inner space E into a first flow ensuring cooling of the cone 23 itself, and a second flow cooling the components located in the inner space.

Advantageously, the wall of the cone 23 is made as a double-wall in order to delimit a space of revolution wherein the first flow circulates so as to cool down more effectively this wall which is directly exposed to the primary flow coming out of the exhaust casing 21.

Advantageously, the gearbox is entirely installed in the outlet cone 23, downstream of the low-pressure turbine and in particular downstream of the radial arms 38 of the exhaust casing 21 to shift the centre of gravity of the engine downwards. Unlike fixed blades that might equip the exhaust casing, such radial arms have a structural function and one or more of these radial arms serves as a utility passage, that is to say the transmission of a mechanical command or others between the inside and the outside of this exhaust casing.

This assembly of the gearbox downstream of the radial arms is preferable considering the cantilevered weight of the engine installed under the wing of the aircraft. For the same purpose, the bearings 26, 27 and 34 are advantageously located longitudinally the closest to the radial arms 38.

In general, the invention allows bringing the natural frequencies of the low-pressure rotating elements off its rotational frequencies. Thus, it allows limiting the implementation of complex bearings such as SFD bearings, and reducing the balance accuracy required for the low-pressure spool.

The invention claimed is:

1. A double-flow turbojet engine comprising:
   a central shaft coaxially surrounded by a low-pressure rotor and by a high-pressure spool, coaxial with each other, the high-pressure spool being rotatably independent of the low-pressure rotor and of the central shaft, said turbojet engine including from upstream to downstream according to a direction of circulation of a flow that passes therethrough when the turbojet engine is operating:
   a fan driven by the central shaft;
   a low-pressure compressor carried by the low-pressure rotor;
   an inter-compressor casing;
   a high-pressure compressor and a high-pressure turbine belonging to the high-pressure spool;
   an inter-turbine casing;
   a low-pressure turbine carried by the low-pressure rotor;
   an exhaust casing;
   said turbojet engine further including:
   an upstream rotor bearing carried by the inter-compressor casing and which rotatably guides the low-pressure rotor;
   a downstream rotor bearing carried by the exhaust casing, and which rotatably guides the low-pressure rotor;
   a gearbox through which the low-pressure rotor drives the central shaft, said gearbox being located downstream of the downstream rotor bearing; and
   a downstream central shaft bearing which rotatably guides the central shaft while being located downstream of the downstream rotor bearing, the downstream central shaft bearing being an inter-shaft bearing which surrounds the central shaft and which is surrounded by the low-pressure rotor.

2. The turbojet engine according to claim 1, wherein the gearbox is located downstream of at least one radial arm for the passage of a utility belonging to the exhaust casing and linking an inner shroud of the exhaust casing to an outer shroud of said exhaust casing.

3. The turbojet engine according to claim 1, further comprising a low-pressure middle bearing carried by the inter-turbine casing and receiving the low-pressure rotor.

4. The turbojet engine according to claim 1, further comprising an outlet cone carried by the exhaust casing, and wherein the downstream central shaft bearing is located in an inner space of the outlet cone.

5. The turbojet engine according to claim 1, further comprising an outlet cone carried by the exhaust casing, and wherein the gearbox is located inside an inner space of the outlet cone.

6. The turbojet engine according to claim 1, wherein the gearbox is an epicycloidal gearbox comprising:
   planets carried by a planet carrier which is rotatably guided by the central shaft;
   an inner crown which is carried by the low-pressure rotor;
   an outer crown which is carried by the exhaust casing;
   each planet meshing with the inner crown and the outer crown.

7. The turbojet engine according claim 1, wherein the gearbox is a planetary gearbox comprising:
   planets carried by a planet carrier which is carried by the exhaust casing;
   an inner crown which is carried by the low-pressure rotor;
   an outer crown which is carried by the central shaft;
   each planet meshing with the inner crown and the outer crown.

* * * * *